(12) United States Patent
Jin et al.

(10) Patent No.: US 12,506,393 B2
(45) Date of Patent: Dec. 23, 2025

(54) MOTOR VIBRATING DEVICE

(71) Applicant: AAC Microtech (Changzhou) Co., Ltd., Jiangsu (CN)

(72) Inventors: Xin Jin, Changzhou (CN); Fan Zhang, Changzhou (CN); Wei Song, Changzhou (CN); Ronglin Linghu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 287 days.

(21) Appl. No.: 18/342,687

(22) Filed: Jun. 27, 2023

(65) Prior Publication Data

US 2024/0235356 A1 Jul. 11, 2024

Related U.S. Application Data

(63) Continuation of application No. PCT/CN2023/072795, filed on Jan. 18, 2023.

(30) Foreign Application Priority Data

Jan. 5, 2023 (CN) .......................... 202320024265.X

(51) Int. Cl.
*H04R 1/02* (2006.01)
*H02K 5/22* (2006.01)
(Continued)

(52) U.S. Cl.
CPC ............. *H02K 33/16* (2013.01); *H02K 5/225* (2013.01); *H02K 33/02* (2013.01); *H02K 33/18* (2013.01)

(58) Field of Classification Search
CPC ........ H02K 33/00; H02K 33/02; H02K 33/16; H02K 33/18; H02K 35/00; H02K 35/02;
(Continued)

(56) References Cited

U.S. PATENT DOCUMENTS 10,069,369 B2 * 9/2018 Xu ........................... H02K 5/10
10,819,204 B2 * 10/2020 Mao ....................... H02K 33/12
(Continued)

FOREIGN PATENT DOCUMENTS

CN 105024517 A * 11/2015 ............. H02K 33/16
CN 205544862 U * 8/2016 ............. H02K 33/16
(Continued)

OTHER PUBLICATIONS

Translation of International Search Report for PCT/CN2023/072795 (Year: 2023).*

*Primary Examiner* — Edgardo San Martin
(74) *Attorney, Agent, or Firm* — Wiersch Law Group

(57) ABSTRACT

A motor vibrating device includes a housing defining an accommodating space, a vibrating unit accommodated in the accommodating space, elastic pieces elastically suspending the vibrating unit, and a driving assembly fixedly accommodated in the housing and driving the vibrating unit to vibrate. The vibrating unit includes a mass block and a rotor. The driving assembly is one of at least one driving coil and a magnetic steel assembly. The rotor is the other one of the at least one driving coil and the magnetic steel assembly. Two ends of each of the elastic pieces are respectively fixed to the mass block and the housing. The mass block includes a first mass block assembly and a second mass block fixed to the first mass block assembly. The elastic pieces are fixed to the second mass block. A weight of the motor vibrating device is adjustable, which saves costs.

12 Claims, 8 Drawing Sheets

(51) Int. Cl.
 *H02K 33/02* (2006.01)
 *H02K 33/16* (2006.01)
 *H02K 33/18* (2006.01)
 *H04R 9/02* (2006.01)
 *H04R 9/04* (2006.01)

(58) Field of Classification Search
 CPC . H04R 9/025; H04R 9/02; H04R 9/06; H04R 9/04; H04R 9/047; H04R 9/046; H04R 1/24; H04R 1/028; H04R 7/04; H04R 2400/03; H04R 2400/11; H04R 2499/11; B06B 1/045; B06B 1/04
 See application file for complete search history.

(56) References Cited

U.S. PATENT DOCUMENTS

| | | | | |
|---|---|---|---|---|
| 11,968,514 B2* | 4/2024 | Xiao | | H04R 9/06 |
| 11,968,515 B2* | 4/2024 | Xiao | | H04R 9/063 |
| 12,041,435 B2* | 7/2024 | Xiao | | H04R 9/025 |
| 12,051,957 B2* | 7/2024 | Mao | | H02K 33/16 |
| 12,192,730 B2* | 1/2025 | Tang | | H04R 1/02 |
| 12,317,047 B2* | 5/2025 | Ren | | H04R 9/045 |
| 12,317,051 B2* | 5/2025 | Mao | | H04R 9/06 |
| 2017/0033662 A1* | 2/2017 | Wang | | H02K 33/02 |
| 2022/0200430 A1* | 6/2022 | Cui | | H02K 1/17 |
| 2024/0089662 A1* | 3/2024 | Tang | | H04R 9/025 |
| 2024/0205576 A1* | 6/2024 | Mao | | H04R 9/046 |
| 2024/0235354 A1* | 7/2024 | Jin | | H02K 33/06 |
| 2025/0056163 A1* | 2/2025 | Song | | H04R 1/02 |

FOREIGN PATENT DOCUMENTS

| | | | | | |
|---|---|---|---|---|---|
| CN | 115051525 A | * | 9/2022 | | H02K 33/02 |
| CN | 115396792 A | * | 11/2022 | | H04R 9/025 |
| CN | 115499764 A | * | 12/2022 | | H04R 9/02 |
| CN | 218830621 U | * | 4/2023 | | H04R 9/02 |
| CN | 218976533 U | * | 5/2023 | | H02K 33/00 |
| JP | 6745083 B2 | * | 8/2020 | | H02K 33/14 |
| WO | WO-2021121055 A1 | * | 6/2021 | | H02K 33/00 |

* cited by examiner

MOTOR VIBRATING DEVICE

TECHNICAL FIELD

The present disclosure relates to a field of vibrating motors, and in particular to a motor vibrating device applied to electronic motors.

BACKGROUND

With advent of the mobile Internet era, the number of smart mobile devices continues to increase. Among various mobile devices, a mobile phone is undoubtedly the most common and portable mobile terminal device. Currently, the mobile phone has various functions, such as a high-quality music playing functions and a vibrating function. Therefore, sounding devices with the vibrating function and a sound playing function are widely used in the smart mobile devices.

The vibrating motor in the prior art comprises a housing and a motor vibrating system accommodated in the housing. The motor vibrating system comprises a mass block and a driving coil fixed to the mass block. One side of the mass block is welded to a spring plate by laser welding, so the mass block is suspended in the housing.

However, the mass block in the prior art is integrally formed and made of same material. When a density of the mass block is small, an overall volume of the mass block must be large for counterweight, which occupies a large installation space. Moreover, a quality adjustment effect of the mass block that is integrally formed is poor, resulting in a small application scope.

Therefore, it is necessary to provide a motor vibrating device to solve above technical problems.

SUMMARY

A purpose of the present disclosure is to provide a motor vibrating device with separate sub mass blocks, which is convenient to adjust a mass and saves costs.

To achieve the above purpose, the present disclosure provides the motor vibrating device. The motor vibrating device comprises a housing defining an accommodating space, a vibrating unit accommodated in the accommodating space, elastic pieces elastically suspending the vibrating unit in the accommodating space, and a driving assembly fixedly accommodated in the housing.

The driving assembly is configured to drive the vibrating unit to vibrate. The vibrating unit comprises a mass block and a rotor fixed to the mass block. The driving assembly is one of at least one driving coil and a magnetic steel assembly. The rotor is the other one of the at least one driving coil and the magnetic steel assembly. A first end of each of the elastic pieces is fixed to the mass block. A second end of each of the elastic pieces is fixed to the housing.

The mass block comprises a first mass block assembly and a second mass block fixedly attached to a peripheral side of the first mass block assembly. The elastic pieces are fixed to the second mass block. The first mass block assembly comprises first mass blocks. The first mass blocks are stacked to define an accommodating groove. The rotor is fixed in the accommodating groove.

Optionally, when the driving assembly is the at least one driving coil and the rotor is the magnetic steel assembly, the second mass block comprises a first mass block body and connecting portions. The first mass block body is extended toward the magnetic steel assembly to form the connecting portions. Each of the connecting portions is fixed to the first end of a corresponding elastic piece. The first mass blocks are fixed to a first side of the first mass block body close to the magnetic steel assembly.

Optionally, the first mass block assembly comprises a main body and a first mounting groove. The main body is fixed to a first side of the first mass block body close to the at least one driving coil. The first mounting groove penetrates the main body.

The magnetic steel assembly comprises a first magnetic steel mounted in the first mounting groove and second magnetic steels. The second magnetic steels are spaced apart. The second magnetic steels are disposed on two opposite sides of the first magnetic steel. The at least one driving coil is spaced apart from the first magnetic steel and the second magnetic steels. The at least one driving coil is disposed on one side of the first magnetic steel and one side of each of the second magnetic steels away from the second mass block.

Optionally, the second mass block is welded to the first end of each of the elastic pieces for fixing.

Optionally, the mass block further comprises a third mass block. The third mass block is fixed to a second side of the first mass block body away from the first mass blocks.

Optionally, the mass block further comprises two fourth mass blocks. The fourth mass blocks are spaced apart. The fourth mass blocks are disposed on one side of the first mass block assembly away from the second mass block. The two fourth mass blocks are respectively disposed on two opposite sides of the magnetic steel assembly.

Optionally, the motor vibrating device further comprises a first conductive connecting piece electrically connected to the at least one driving coil. The first conductive connecting piece comprises a first fixing portion fixed to one side of the magnetic steel assembly and a first extending portion. The first extending portion is extended from the first fixing portion to the housing.

Optionally, when the driving assembly is the magnetic steel assembly and the rotor is the at least one driving coil, the motor vibrating device further comprises a sounding unit accommodated in the accommodating space. The housing comprises a sound outlet penetrating one side of the housing. The sounding unit comprises a basin frame and a vibrating system fixed to the basin frame. The magnetic steel assembly defines a magnetic gap and drives the vibrating system to vibrate. The vibrating system vibrates to generate sound.

The vibrating system comprises a diaphragm fixed to the basin frame and a voice coil driving the diaphragm to vibrate. The diaphragm vibrates to generate sound.

The magnetic steel assembly comprises a main magnetic steel, first auxiliary magnetic steels, and second auxiliary magnetic steels. The first auxiliary magnetic steels and second auxiliary magnetic steels are disposed around the main magnetic steel. The main magnetic steel, the first auxiliary magnetic steels, and the second auxiliary magnetic steels are spaced apart to form the magnetic gap. The voice coil is inserted into the magnetic gap.

The second mass block comprises a second mass block body and two second mounting grooves. The second mounting grooves penetrate the second mass block body in a direction away from the second auxiliary magnetic steels. Two driving coils are provided. The two driving coils are one-to-one fixed to the two second mounting grooves. The two driving coils are spaced apart from each other.

Optionally, the mass block further comprises fifth mass blocks covering one side of the first mass block assembly close to the vibrating system.

Optionally, the magnetic steel assembly further comprises a main pole core fixed to a first side of the main magnetic steel close to the vibrating system, a first main magnetic steel fixed to one side of the main pole core close to the vibrating system, a second main magnetic steel fixed to a second side of the main magnetic steel away from the vibrating system, and an auxiliary pole core. The auxiliary pole core covers one side of each of the first auxiliary magnetic steels close to the vibrating system and one side of each of the second auxiliary magnetic steels close to the vibrating system. An outer side of the auxiliary pole core is fixed to the basin frame.

Optionally, the motor vibrating device further comprises a second conductive connecting piece electrically connected to the driving coils. The second conductive connecting piece comprises a second fixing portion, a first elastic arm, and a second extending portion. The second fixing portion is fixed to one side of the mass block away from the vibrating system. The first elastic arm is bent and extended from the second fixing portion. The second extending portion passes through the housing and is at least partially exposed out of the housing.

Optionally, the motor vibrating device further comprises a third conductive connecting piece electrically connected to the voice coil. The third conductive connecting piece comprises a third fixing portion, a second elastic arm, and a third extending portion. The third fixing portion is fixed to one side of the voice coil close to the vibrating system. The second elastic arm is bent and extended from the third fixing portion. The third extending portion passes through the housing and is at least partially exposed out of the housing.

Compared with the prior art, the motor vibrating device comprises the housing, the vibrating unit, the elastic pieces, and the driving assembly. The vibrating unit comprises the mass block and the rotor fixed to the mass block. The driving assembly is one of the at least one driving coil and the magnetic steel assembly. The rotor is the other one of the at least one driving coil and the magnetic steel assembly. The first end of each of the elastic pieces is fixed to the mass block. The second end of each of the elastic pieces is fixed to the housing. The mass block comprises the first mass block assembly and the second mass block fixedly attached to the peripheral side of the first mass block assembly. The elastic pieces are fixed to the second mass block. The first mass block assembly comprises the first mass blocks. The first mass blocks are stacked to define the accommodating groove. The rotor is fixed in the accommodating groove. Since the mass block comprises the first mass block assembly and the second mass block, the first mass blocks and the second block are separately disposed, which is convenient to manufacture. The rotor is fixedly mounted on the second mass block. The rotor is driven by the driving assembly to realize a vibration effect of the motor vibrating device. Further, the first mass blocks and the second block are made of different materials to have different weights, so as to realize different gradients of motor performance and a good vibration effect.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
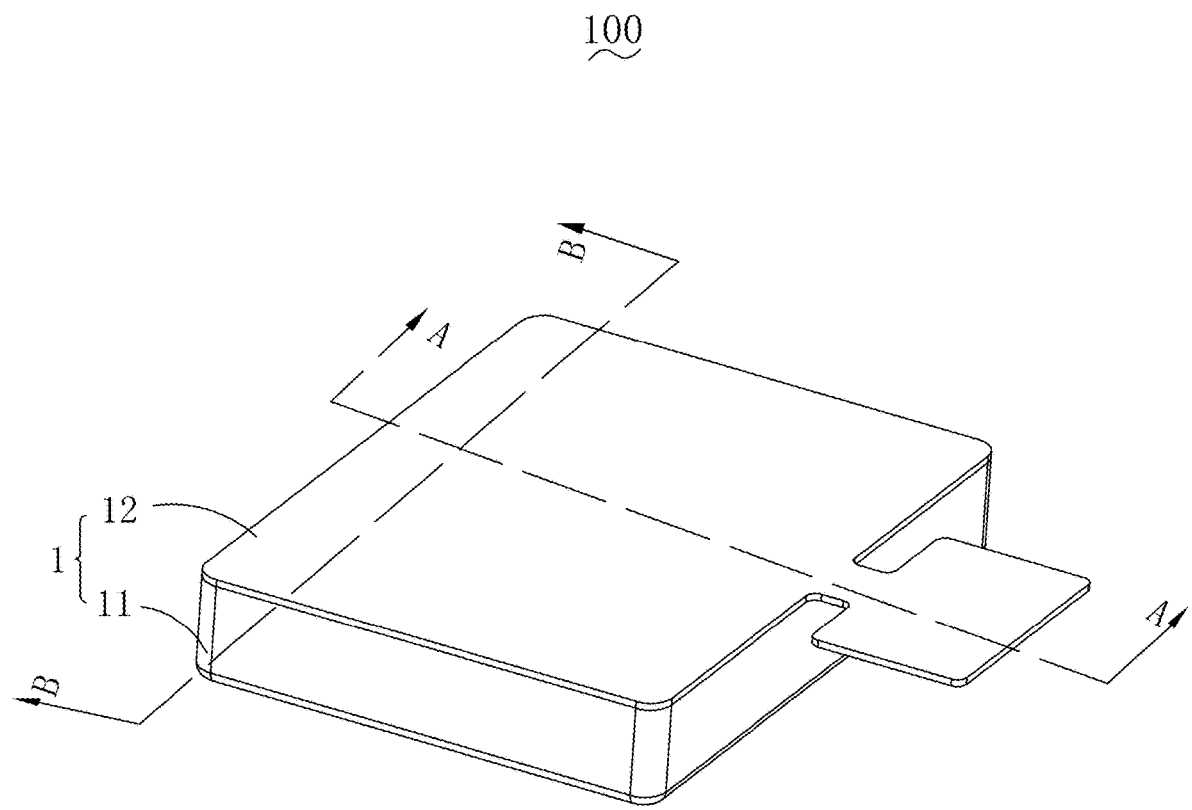
FIG. 1 is a perspective schematic diagram of a motor vibrating device according to one embodiment of the present disclosure.
Figure 2:
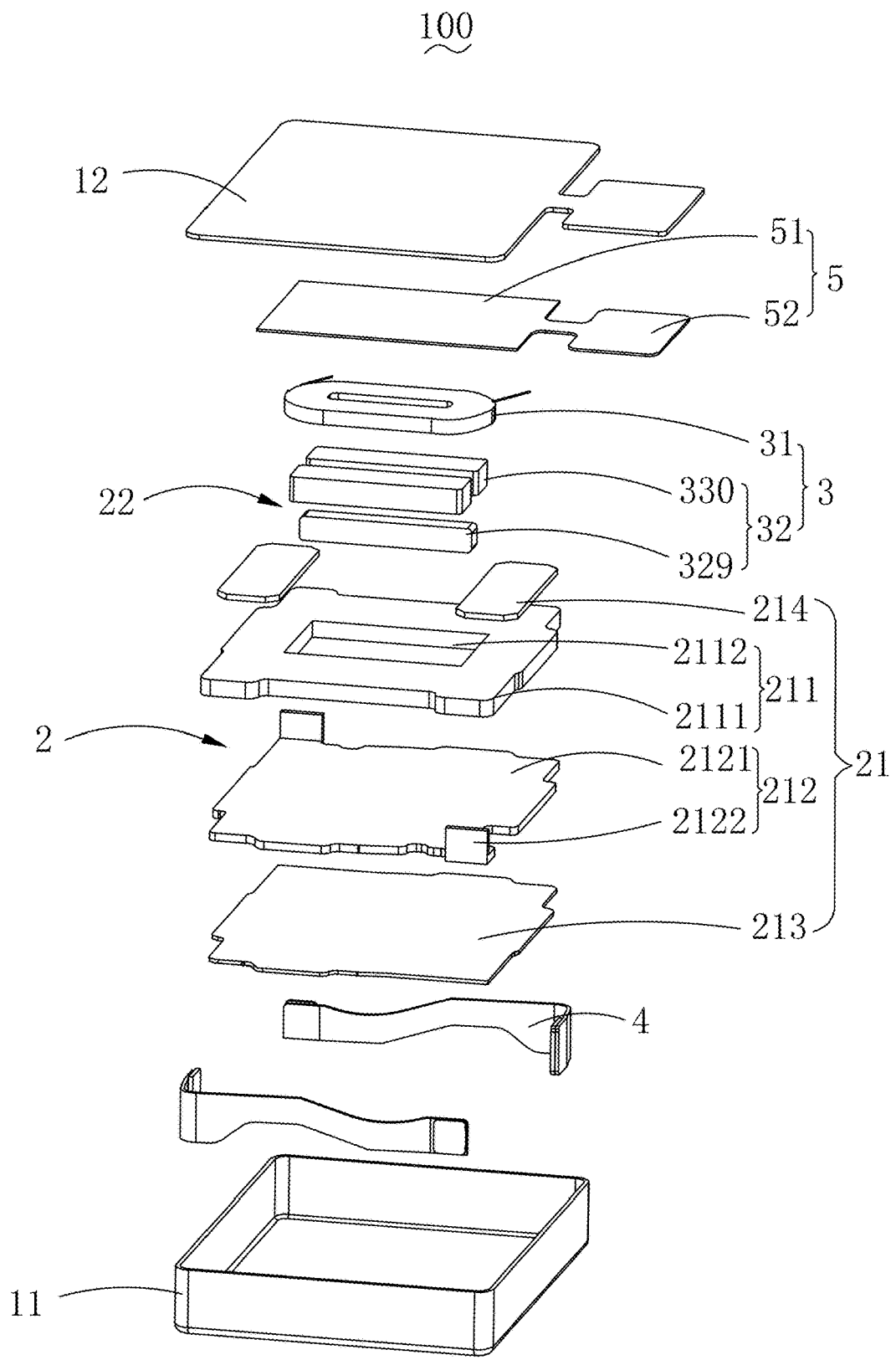
FIG. 2 is an exploded perspective schematic diagram of the motor vibrating device according to one embodiment of the present disclosure.
Figure 3:
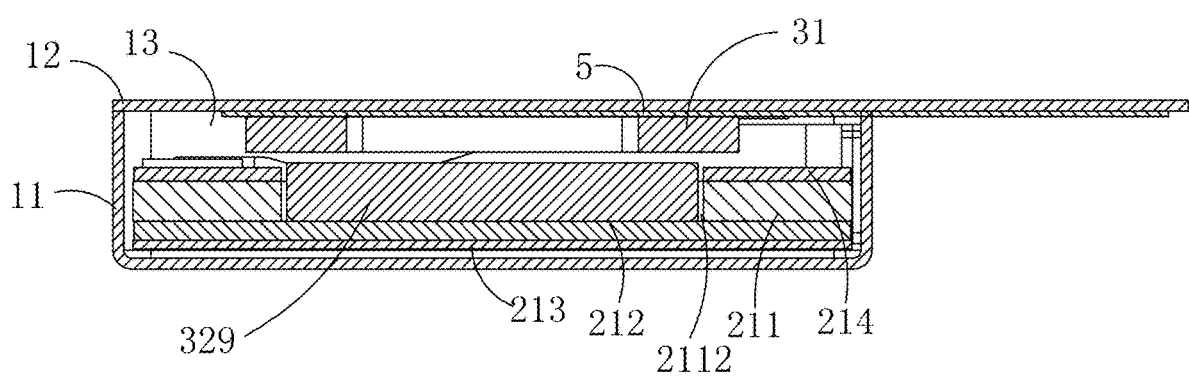
FIG. 3 is a cross-sectional schematic diagram of the motor vibrating device taken along the line A-A shown in FIG. 1.
Figure 4:
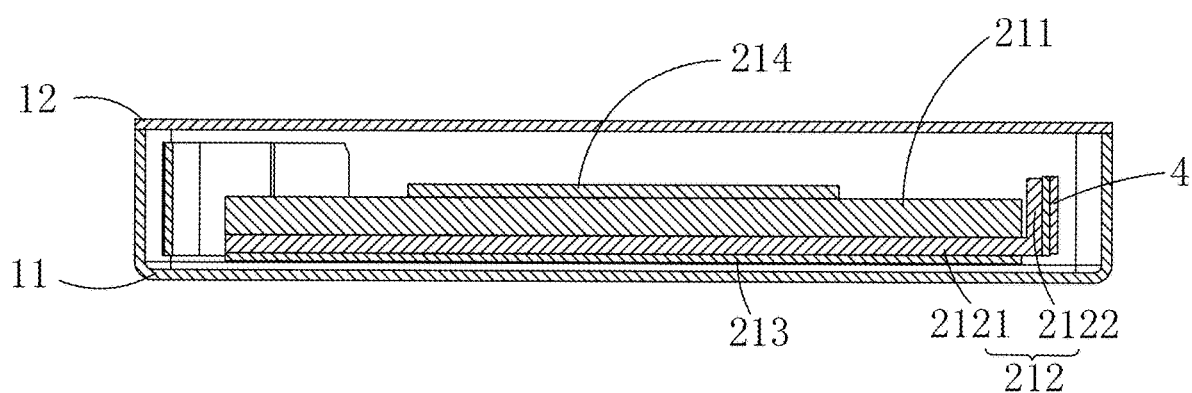
FIG. 4 is a cross-sectional schematic diagram of the motor vibrating device taken along the line B-B shown in FIG. 1.
Figure 5:
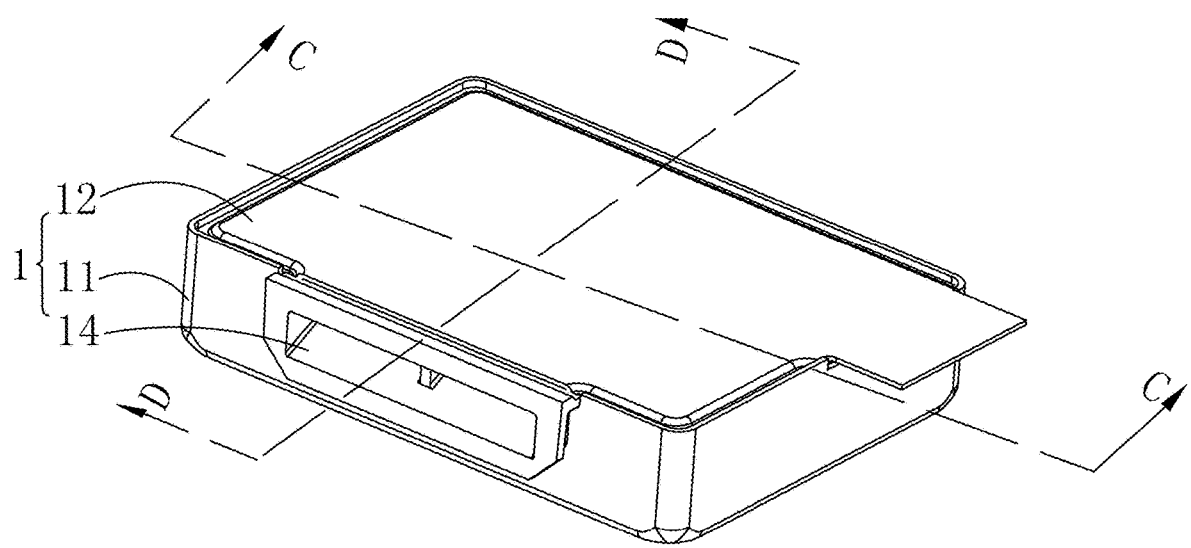
FIG. 5 is a perspective schematic diagram of the motor vibrating device according to another embodiment of the present disclosure.
Figure 6:
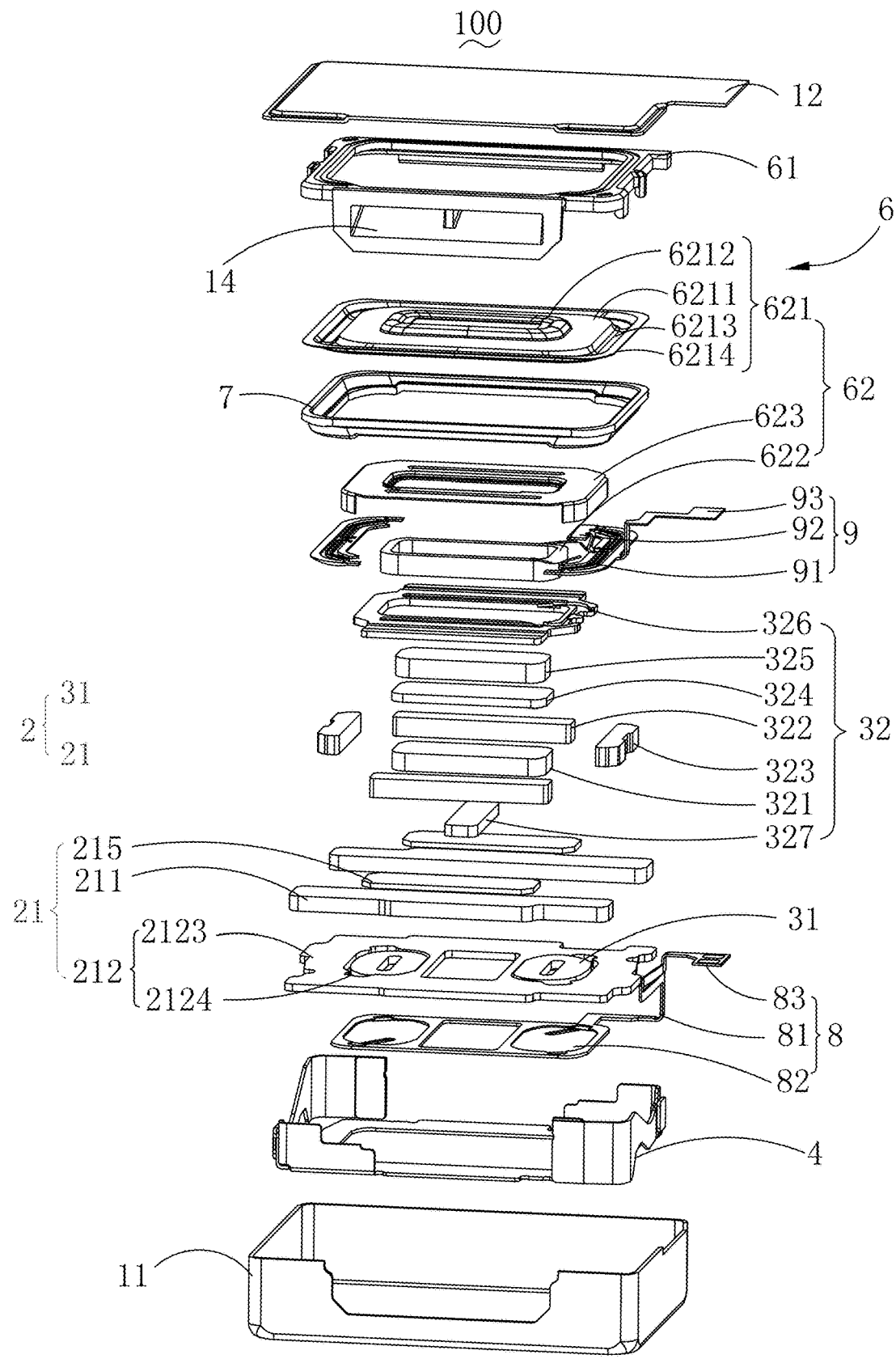
FIG. 6 is an exploded perspective schematic diagram of the motor vibrating device according to another embodiment of the present disclosure.
Figure 7:
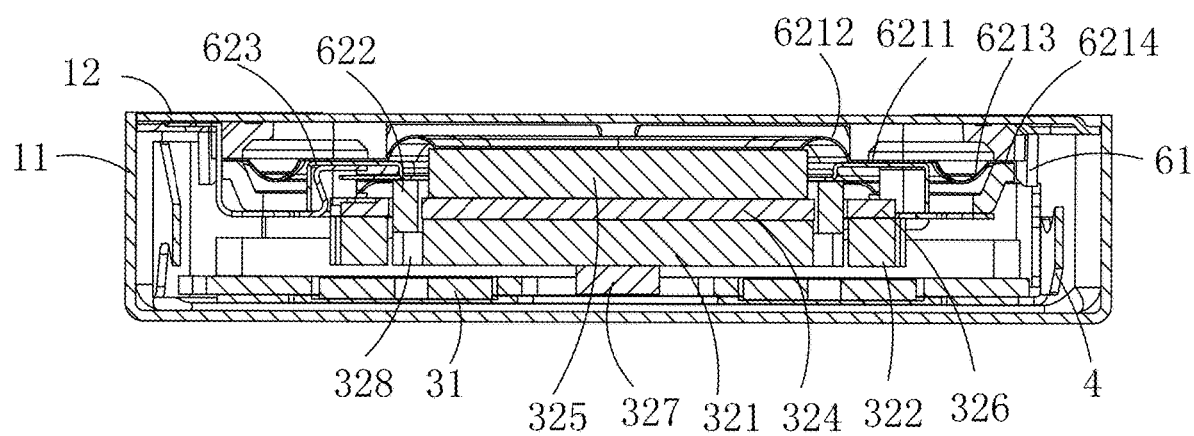
FIG. 7 is a cross-sectional schematic diagram of the motor vibrating device taken along the line C-C shown in FIG. 5.
Figure 8:
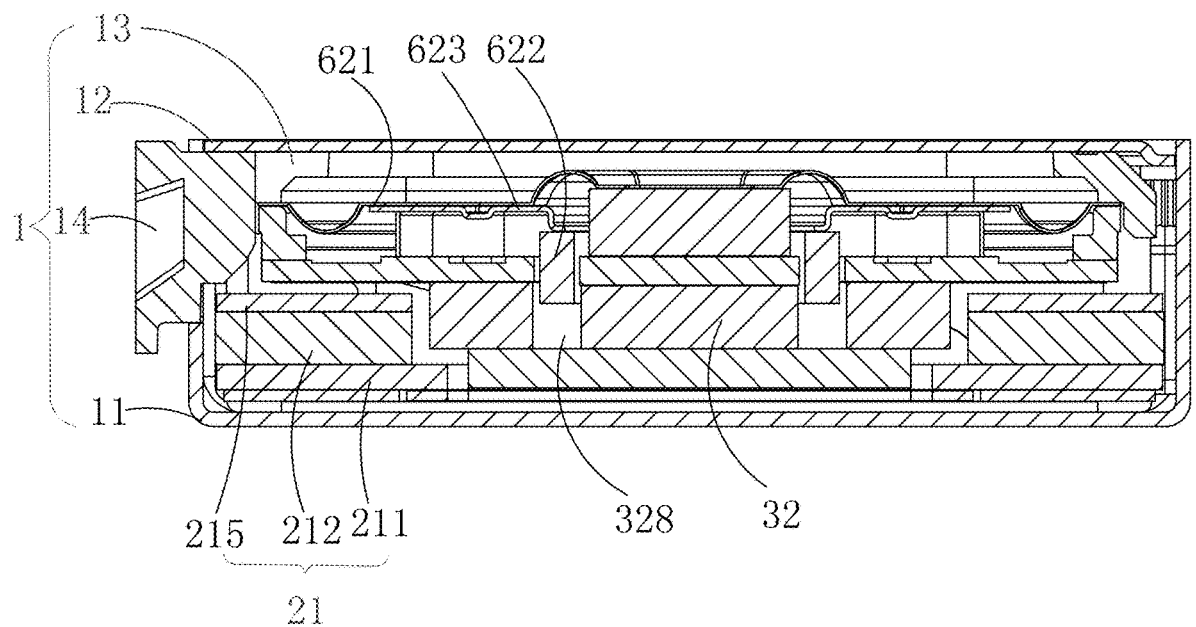
FIG. 8 is a cross-sectional schematic diagram of the motor vibrating device taken along the line D-D shown in FIG. 5.

As shown in FIGS. 1-8, the present disclosure provides a motor vibrating device 100. The motor vibrating device 100 comprises a housing 1 defining an accommodating space 13, a vibrating unit 2 accommodated in the accommodating space 13, elastic pieces 4 elastically suspending the vibrating unit 2 in the accommodating space 13, and a driving assembly 3 fixedly accommodated in the housing 1. The driving assembly 3 is configured to drive the vibrating unit 2 to vibrate.

The vibrating unit 2 comprises a mass block 21 and a rotor 22 fixed to the mass block 21. The driving assembly 3 is one of at least one driving coil 31 and a magnetic steel assembly 32. The rotor 22 is the other one of the at least one driving coil 31 and the magnetic steel assembly 32. A first end of each of the elastic pieces 4 is fixed to the mass block 21. A second end of each of the elastic pieces 4 is fixed to the housing 1. The vibrating unit 2 is suspended in the accommodating space 13 through the elastic pieces 4, so that the vibrating unit 2 has a good recovery effect during a vibration process. The rotor 22 is fixed on the mass block 21, and the driving assembly 3 drives the rotor 22 to vibrate. A weight of the mass block 21 increase a vibration performance of the vibrating unit 2.

The mass block 21 comprises a first mass block assembly and a second mass block 212 fixedly attached to a peripheral side of the first mass block assembly. The elastic pieces 4 are fixed to the second mass block 212. The first mass block assembly comprises first mass blocks 211. The first mass blocks 211 are stacked to define an accommodating groove. The rotor 22 is fixed in the accommodating groove. Since the mass block comprises the first mass block assembly and the second mass block, the first mass blocks and the second block are separately disposed, which is convenient to manufacture. The rotor 22 is fixedly mounted on the second mass block 212. The rotor 22 is driven by the driving assembly 3 to realize a vibration effect of the motor vibrating device. Further, the first mass blocks and the second block are made of different materials to have different weights, so as to realize different gradients of motor performance and the good vibration effect of the motor vibrating device.

The housing 1 comprises a first housing 11 and a second housing 12 fixedly covered on the first housing 11. The first housing 11 and the second housing 12 form the accommodating space 13 for mounting the vibrating unit 2.

A density of the first mass blocks 211 is greater a density of the second mass block 212, which ensures that a density of the mass block 21 is greater than a density of a conventional mass block, ensures that the second mass block 212 has a lower density than the first blocks and is easy to welded to the elastic pieces, and ensures that a density of other sub mass blocks is higher. Therefore, a counterweight effect of the mass block 21 is good, a volume of the mass block is small, and the vibrating effect thereof is good.

The mass block 21 is configured as a counterweight block to increase a weight of the vibrating unit 2, so as to increase a vibration amplitude of the vibrating unit 2 and make the vibrating unit 2 outputs a high acceleration, thereby improving the vibration performance of the motor vibrating device 100.

Optionally, the mass block 21 is a rectangular structure. Of course, the mass block 21 is not limited to the rectangular structure, and the mass block 21 may be a circular structure, an elliptical structure, etc., as long as the mass block 21 can be used for counterweight, which is not specifically described therein.

Embodiment 1

In the embodiment, as shown in FIGS. 1-4, only one driving coil 3 is provided. When the driving assembly 3 is the driving coil 31 and the rotor 22 is the magnetic steel assembly 32, the second mass block 212 comprises a first mass block body 2121 and connecting portions 2122. The first mass block body 2121 is extended toward the magnetic steel assembly 32 to form the connecting portions 2122. Each of the connecting portions 2122 is fixed to the first end of a corresponding elastic piece 4. The first mass blocks 211 are fixed to a first side of the first mass block body 2121 close to the magnetic steel assembly 32.

The first mass block body 2121 is configured for mounting the first mass blocks 211 and the magnetic steel assembly 32. The magnetic steel assembly 32 is fixed on the first mass block body 2121. Each of the connecting portions 2122 is connected to the first end of the corresponding elastic piece 4. The driving coil 31 drives the magnetic steel assembly 32 to vibrate. Since counterweight positions of the first mass blocks 211 and a counterweight position of the second mass block 212 are different, and since the first mass blocks 211 and the second mass block 212 are made of different counterweight materials having different densities, the motor vibrating device may have different weights, which improves an adjustment effect.

In the embodiment, the first mass block assembly comprises a main body 2111 and a first mounting groove 2112. The main body 2111 is fixed to the first side of the first mass block body 2121 close to the driving coil 31. The first mounting groove 2112 penetrates the main body 2111.

The magnetic steel assembly 32 comprises a first magnetic steel 329 mounted in the first mounting groove 2112 and second magnetic steels 330. The second magnetic steels are spaced apart. The second magnetic steels 330 are disposed on two opposite sides of the first magnetic steel 329. The driving coil 31 is spaced apart from the first magnetic steel 329 and the second magnetic steels 330. The driving coil 31 is disposed on one side of the first magnetic steel 329 and one side of each of the second magnetic steels 330 away from the second mass block 212. The first mounting groove 2112 is configured to limit and mount the first magnetic steel 329 and the second magnetic steels 330. The first magnetic steel 329 and/or the second magnetic steels 330 are driven by the driving coil 31, so as to realize different motor vibration performances.

In the embodiment, the second mass block 212 is welded to the first end of each of the elastic pieces 4 for fixing. By welding the second mass block 212 to the first end of each of the elastic pieces 4, the first mass blocks 211 are not limited by laser welding requirements. The material and surface treatment of the first mass block 211 have more choices, so that costs of the material and costs of the surface treatment are reduced.

In the embodiment, at least two elastic pieces 4 are provided. The at least two elastic pieces 4 are respectively disposed on opposite sides of the mass block 21 along a vibrating direction of the vibrating unit 2. The elastic pieces 4 stably support the mass block 21. The elastic pieces 4 are U-shaped or C-shaped springs. In the embodiment, the elastic pieces 4 are the U-shaped springs.

In the embodiment, the mass block 21 further comprises a third mass block 213. The third mass block 213 is fixed to a second side of the first mass block body 2121 away from the first mass blocks 211. Therefore, a weight of the motor vibrating device is increased and the vibration performance of the motor vibrating device is improved.

In the embodiment, the mass block 21 further comprises two fourth mass blocks 214. The fourth mass blocks 214 are spaced apart. The fourth mass blocks are disposed on one side of the first mass block assembly 211 away from the second mass block 212. The two fourth mass blocks 214 are respectively disposed on two opposite sides of the magnetic steel assembly 32.

Different position, corresponding to different sub mass blocks, of mass block 21 have different weights. The first mass blocks 211, the second mass block 212, the third mass block 213, and the fourth mass blocks 214 are made of different or same materials. Therefore, the weight of the motor vibrating device is increased and the vibration performance of the motor vibrating device is improved.

Optionally, the mass block is not limited to comprise the first mass blocks 211, the second mass block 212, the third mass block 213, and the fourth mass blocks 214 made of different or same materials, in other embodiments, five or six mass blocks may be provided, which is determined according to actual requirements.

In the embodiment, the motor vibrating device further comprises a first conductive connecting piece 5 electrically connected to the driving coil 31. The first conductive connecting piece 5 comprises a first fixing portion 51 fixed to one side of the magnetic steel assembly 32 and a first extending portion 52. The first extending portion 52 is extended from the first fixing portion 51 to the housing 1.

Embodiment 2

As shown in FIGS. 5-8, when the driving assembly 3 is the magnetic steel assembly 32 and the rotor 22 is the at least one driving coil 31, the motor vibrating device further comprises a sounding unit 6 accommodated in the accommodating space 13. The housing 1 comprises a sound outlet 14 penetrating one side of the housing 1. The sounding unit 6 comprises a basin frame 61 and a vibrating system 62 fixed to the basin frame 61. The magnetic steel assembly 32 defines a magnetic gap 328 and drives the vibrating system 62 to vibrate. The vibrating system 62 vibrates to generate sound.

The vibrating system 62 comprises a diaphragm 621 fixed to the basin frame 61 and a voice coil 622 driving the diaphragm 621 to vibrate. The diaphragm 621 vibrates to generate sound.

The sounding unit 6 further comprises a fixing piece 7 fixed to one side of the basin frame 61 close to the magnetic steel assembly 32. The fixing piece is ring-shaped. The diaphragm 621 is fixed to one side of the fixing piece 7 close to the basin frame 61.

The diaphragm 621 comprises a vibrating portion 6211, an inner bending ring 6212 bent and extended from an inner peripheral edge of the vibrating portion 6211, an outer bending ring 6213 bent and extended from an outer peripheral edge of the vibrating portion 6211, and a fixing portion 6214 extended from the outer bending ring 6213 to the fixing piece 7. The vibrating portion 6211 is ring-shaped. The fixing portion 6214 is fixed to the fixing piece 7. The voice coil 622 is fixed to one side of the vibrating portion 6211 close to the magnetic steel assembly 32. The vibrating system 62 further comprises a frame 623, the frame 623 is fixed to one side of the vibrating portion 6211 close to the magnetic steel assembly 32. The voice coil 622 is fixed to the frame 623

The magnetic steel assembly 32 comprises a main magnetic steel 321, first auxiliary magnetic steels 322, and second auxiliary magnetic steels 323. The first auxiliary magnetic steels 322 and second auxiliary magnetic steels 323 are disposed around the main magnetic steel 321. The main magnetic steel 321, the first auxiliary magnetic steels 322, and the second auxiliary magnetic steels 323 are spaced apart to form the magnetic gap 328. The voice coil 622 is inserted into the magnetic gap 328.

The second mass block 212 comprises a second mass block body 2123 and two second mounting grooves 2124. The second mounting grooves 2124 penetrate the second mass block body 2123 in a direction away from the second auxiliary magnetic steels 323. Two driving coils 31 are provided. The two driving coils 31 are one-to-one fixed to the two second mounting grooves 2124. The two driving coils 31 are spaced apart from each other.

By fixing the driving coils 31 to the mass block 21 and fixing the elastic pieces 4 to the mass block 21 and the housing 1, the mass block 21 is suspended in the accommodating space 13. The mass block 21 is configured for counterweight. By increasing the weight of the vibrating unit 2 through the mass block 21, the vibration amplitude of the vibrating unit 2 is increased, so that the vibrating unit 2 outputs the high acceleration, thereby improving the vibration performance of the sounding unit 2.

The mass block 21 comprises the first mass blocks 211 and the second mass block 212, and the first mass block 211 and the second mass block 212 are disposed separately, which is convenient to manufacture and is low in cost. The driving coils 31 are fixed to the first mass blocks 211, and the magnetic steel assembly 32 is driven by the driving coils 3. Since the magnetic steel assembly 32 is fixed to the basin frame 61 and the first mass blocks 211 are suspended in the accommodating space 13 through the elastic pieces 4, when the driving coils 31 work, the driving coils 31 vibrate horizontally with respect to the magnetic steel assembly 32. Meanwhile, different counterweights of the mass block 21 are realized by configuring different materials for each sub mass block so as to realize different gradients of performance of the motor vibrating device.

In the embodiment, the second mass block 212 is welded to the first end of each of the elastic pieces 4 for fixing. By welding the second mass block 212 to the first end of each of the elastic pieces 4, the first mass blocks 211 are not limited by laser welding requirements. The material and surface treatment of the first mass block 211 have more choices, so that the costs of the material and the costs of the surface treatment are reduced.

In the embodiment, at least two elastic pieces 4 are provided. The at least two elastic pieces 4 are respectively disposed on two opposite sides of the mass block 21 along the vibrating direction of the vibrating unit 2.

In the embodiment, the mass block 21 further comprises fifth mass blocks 215 covering one side of the first mass block assembly close to the vibrating system 62. The driving coils 31 are fixed to the first mass blocks 211, and the magnetic steel assembly 32 is driven by the driving coils 3. Since the magnetic steel assembly 32 is fixed to the basin frame 61 and the first mass blocks 211 are suspended in the accommodating space 13 through the elastic pieces 4, when the driving coils 31 work, the driving coils 31 vibrate horizontally with respect to the magnetic steel assembly 32. Meanwhile, different counterweights of the mass block 21 are realized by configuring different materials for each of the sub mass blocks so as to realize different gradients of performance of the motor vibrating device.

Optionally, the mass block 21 is not limited to comprises the first mass blocks, the second mass block, and the fifth mass blocks, and six or seven mass blocks may be provided, which is determined according to the actual requirements.

In the embodiment, the magnetic steel assembly 32 further comprises a main pole core 324 fixed to a first side of the main magnetic steel 321 close to the vibrating system 62, a first main magnetic steel 325 fixed to one side of the main pole core close to the vibrating system, a second main magnetic steel 327 fixed to a second side of the main magnetic steel 321 away from the vibrating system 62, and an auxiliary pole core 326. The auxiliary pole core 326 covers one side of each of the first auxiliary magnetic steels 322 close to the vibrating system 62 and one side of each of the second auxiliary magnetic steels 323 close to the vibrating system 62. An outer side of the auxiliary pole core 326 is fixed to the basin frame 61. The main pole core 324 and the first main magnetic steel 325 are fixed to the main magnetic steel 321, which enhances a magnetic force of the main magnetic steel 321. The auxiliary pole core 326 is fixedly covered on the first auxiliary magnetic steels 322 and the second auxiliary magnetic steels 323, which enhances magnetic forces of the first auxiliary magnetic steels 322 and the second auxiliary magnetic steels 323. The outer side of the auxiliary pole core 326 is fixed to the basin frame 61, so that the first auxiliary magnetic steels 322 and the second auxiliary magnetic steels 323 are fixed to the basin frame 61, thereby spacing apart from the vibrating unit 2. The driving coils 31 are driven to vibrate in the vibrating direction by the main magnetic steel 321 and the second auxiliary magnetic steels 323.

In the embodiment, the motor vibrating device 100 further comprises a second conductive connecting piece 8 electrically connected to the driving coils 31. The second conductive connecting piece 8 comprises a second fixing portion 82, a first elastic arm 81, and a second extending portion 83. The second fixing portion 82 is fixed to one side of the mass block 21 away from the vibrating system 62. The first elastic arm 82 is bent and extended from the second fixing portion 81. The second extending portion 83 passes through the housing 1 and is at least partially exposed out of the housing 1.

The first elastic arm 81 of the second conductive connecting piece 8 is configured as a vibrating force arm. When the second fixing portion 82 fixed to the vibrating unit 2 moves, by using the first elastic arm 81 configured as the vibrating force arm, vibration is slowed down and is not transmitted to the second extending portion 83. A bonding pad for welding is disposed on a portion of the second extending portion 83 exposed out of the housing 1, so that an external electrical signal is transmitted to the drive coils 31, thereby realizing independent control of the vibrating unit 2. Specifically, the second conductive connecting piece is a flexible printed circuit board (FPCB), and has good conductivity.

In the embodiment, the motor vibrating device 100 further comprises a third conductive connecting piece 9 electrically connected to the voice coil 622. The third conductive connecting piece 9 comprises a third fixing portion 92, a second elastic arm 91, and a third extending portion 93. The third fixing portion 92 is fixed to one side of the voice coil 622 close to the vibrating system 62. The second elastic arm 91 is bent and extended from the third fixing portion 93. The third extending portion 93 passes through the housing 1 and is at least partially exposed out of the housing 1.

The second elastic arm 91 of the third conductive connecting piece 9 is configured as a vibrating force arm. When the third fixing portion 92 fixed to the voice coil 622 moves, by using the second elastic arm 91 configured as the vibrating force arm, vibration is slowed down and is not transmitted to the third extending portion 93. A second bonding pad for welding is disposed on a portion of the third extending portion 93 exposed out of the housing 1, so that an external electrical signal is transmitted to the drive coils 31, thereby realizing independent control of the vibrating unit 2. Specifically, the third conductive connecting piece 9 is a FPCB and has good conductivity.

The housing 1 comprises the first housing 11 and the second housing 12 fixedly covered on the first housing 11. The second end of each of the elastic pieces is fixed to the first housing 11. The basin frame 61 is fixed on one side of the second housing 12 close to the vibrating system 62.

Compared with the prior art, the motor vibrating device of the present disclosure comprises the housing, the vibrating unit, the elastic pieces, and the driving assembly. The vibrating unit comprises the mass block and the rotor fixed to the mass block. The driving assembly is one of the at least one driving coil and the magnetic steel assembly. The rotor is the other one of the at least one driving coil and the magnetic steel assembly. The first end of each of the elastic pieces is fixed to the mass block. The second end of each of the elastic pieces is fixed to the housing. The mass block comprises the first mass block assembly and the second mass block fixedly attached to the peripheral side of the first mass block assembly. The elastic pieces are fixed to the second mass block. The first mass block assembly comprises the first mass blocks. The first mass blocks are stacked to define the accommodating groove. The rotor is fixed in the accommodating groove. Since the mass block comprises the first mass block assembly and the second mass block, the first mass blocks and the second block are separately disposed, which is convenient to manufacture. The rotor is fixedly mounted on the second mass block. The rotor is driven by the driving assembly to realize the vibration effect of the motor vibrating device. Further, the sub mass blocks are made of different materials to have different weights, so as to realize different gradients of the performance of the motor vibrating device and the good vibration effect.

The above are only the embodiments of the present disclosure. It should be pointed out that for those of ordinary skill in the art, improvements can be made without departing from the inventive concept of the present disclosure, and these improvements fall within the protection scope of the present disclosure.

What is claimed is:

1. A motor vibrating device, comprising:
a housing defining an accommodating space,
a vibrating unit accommodated in the accommodating space,
elastic pieces elastically suspending the vibrating unit in the accommodating space, and
a driving assembly fixedly accommodated in the housing;
wherein the driving assembly is configured to drive the vibrating unit to vibrate; the vibrating unit comprises a mass block and a rotor fixed to the mass block; the driving assembly is one of at least one driving coil and a magnetic steel assembly; the rotor is the other one of the at least one driving coil and the magnetic steel assembly; a first end of each of the elastic pieces is fixed to the mass block; a second end of each of the elastic pieces is fixed to the housing;
the mass block comprises a first mass block assembly and a second mass block fixedly attached to a peripheral side of the first mass block assembly; the elastic pieces are fixed to the second mass block; the first mass block assembly comprises first mass blocks; the first mass blocks are connected to define an accommodating groove; the rotor is fixed in the accommodating groove.

2. The motor vibrating device according to claim 1, wherein when the driving assembly is the at least one driving coil and the rotor is the magnetic steel assembly, the second mass block comprises a first mass block body and connecting portions; the first mass block body is extended toward the magnetic steel assembly to form the connecting portions; each of the connecting portions is fixed to the first end of a corresponding elastic piece; the first mass blocks are fixed to a first side of the first mass block body close to the magnetic steel assembly.

3. The motor vibrating device according to claim 2, wherein the first mass block assembly comprises a main body and a first mounting groove; the main body is fixed to the first side of the first mass block body close to the at least one driving coil; the first mounting groove penetrates the main body;
wherein the magnetic steel assembly comprises a first magnetic steel mounted in the first mounting groove and second magnetic steels; the second magnetic steels are spaced apart; the second magnetic steels are disposed on two opposite sides of the first magnetic steel; the at least one driving coil is spaced apart from the first magnetic steel and the second magnetic steels; the at least one driving coil is disposed on one side of the first magnetic steel and one side of each of the second magnetic steels away from the second mass block.

4. The motor vibrating device according to claim 1, wherein the second mass block is welded to the first end of each of the elastic pieces for fixing.

5. The motor vibrating device according to claim 2, wherein the mass block further comprises a third mass block; the third mass block is fixed to a second side of the first mass block body away from the first mass blocks.

6. The motor vibrating device according to claim 2, wherein the mass block further comprises two fourth mass blocks; the fourth mass blocks are spaced apart; the fourth mass blocks are disposed on one side of the first mass block assembly away from the second mass block; the two fourth mass blocks are respectively disposed on two opposite sides of the magnetic steel assembly.

7. The motor vibrating device according to claim 1, wherein the motor vibrating device further comprises a first conductive connecting piece electrically connected to the at least one driving coil; the first conductive connecting piece comprises a first fixing portion fixed to one side of the magnetic steel assembly and a first extending portion; the first extending portion is extended from the first fixing portion to the housing.

8. The motor vibrating device according to claim 1, wherein when the driving assembly is the magnetic steel assembly and the rotor is the at least one driving coil, the motor vibrating device further comprises a sounding unit accommodated in the accommodating space; the housing comprises a sound outlet penetrating one side of the housing; the sounding unit comprises a basin frame and a vibrating system fixed to the basin frame; the magnetic steel assembly defines a magnetic gap and drives the vibrating system to vibrate; the vibrating system vibrates to generate sound;

wherein the vibrating system comprises a diaphragm fixed to the basin frame and a voice coil driving the diaphragm to vibrate; the diaphragm vibrates to generate sound;

wherein the magnetic steel assembly comprises a main magnetic steel, first auxiliary magnetic steels, and second auxiliary magnetic steels; the first auxiliary magnetic steels and second auxiliary magnetic steels are disposed around the main magnetic steel; the main magnetic steel, the first auxiliary magnetic steels, and the second auxiliary magnetic steels are spaced apart to form the magnetic gap; the voice coil is inserted into the magnetic gap;

wherein the second mass block comprises a second mass block body and two second mounting grooves; the second mounting grooves penetrate the second mass block body in a direction away from the second auxiliary magnetic steels; two driving coils are provided; the two driving coils are one-to-one fixed to the two second mounting grooves; the two driving coils are spaced apart from each other.

9. The motor vibrating device according to claim 8, wherein the mass block further comprises fifth mass blocks covering one side of the first mass block assembly close to the vibrating system.

10. The motor vibrating device according to claim 8, wherein the magnetic steel assembly further comprises a main pole core fixed to a first side of the main magnetic steel close to the vibrating system, a first main magnetic steel fixed to one side of the main pole core close to the vibrating system, a second main magnetic steel fixed to a second side of the main magnetic steel away from the vibrating system, and an auxiliary pole core; the auxiliary pole core covers one side of each of the first auxiliary magnetic steels close to the vibrating system and one side of the second auxiliary magnetic steels close to the vibrating system; an outer side of the auxiliary pole core is fixed to the basin frame.

11. The motor vibrating device according to claim 10, wherein the motor vibrating device further comprises a second conductive connecting piece electrically connected to the driving coils; the second conductive connecting piece comprises a second fixing portion, a first elastic arm, and a second extending portion; the second fixing portion is fixed to one side of the mass block away from the vibrating system; the first elastic arm is bent and extended from the second fixing portion; the second extending portion passes through the housing and is at least partially exposed out of the housing.

12. The motor vibrating device according to claim 8, wherein the motor vibrating device further comprises a third conductive connecting piece electrically connected to the voice coil; the third conductive connecting piece comprises a third fixing portion, a second elastic arm, and a third extending portion; the third fixing portion is fixed to one side of the voice coil close to the vibrating system; the second elastic arm is bent and extended from the third fixing portion; the third extending portion passes through the housing and is at least partially exposed out of the housing.

\* \* \* \* \*